(12) United States Patent
Anichkov

(10) Patent No.: US 11,451,062 B2
(45) Date of Patent: Sep. 20, 2022

(54) METHOD AND SYSTEM FOR CONTROLLING A RENEWABLE ENERGY PLANT

(71) Applicant: MERIT SI, LLC, Annandale, NJ (US)

(72) Inventor: Dmitriy Anichkov, Somerville, NJ (US)

(73) Assignee: MERIT SI, LLC, Annandale, NJ (US)

( * ) Notice: Subject to any disclaimer, the term of this patent is extended or adjusted under 35 U.S.C. 154(b) by 170 days.

(21) Appl. No.: 17/040,564

(22) PCT Filed: Apr. 9, 2019

(86) PCT No.: PCT/US2019/026560
§ 371 (c)(1),
(2) Date: Sep. 23, 2020

(87) PCT Pub. No.: WO2019/199806
PCT Pub. Date: Oct. 17, 2019

(65) Prior Publication Data
US 2021/0367429 A1    Nov. 25, 2021

Related U.S. Application Data

(60) Provisional application No. 62/657,745, filed on Apr. 14, 2018.

(51) Int. Cl.
*H02J 3/38* (2006.01)
*H02J 3/06* (2006.01)
*H02J 3/16* (2006.01)

(52) U.S. Cl.
CPC ............ *H02J 3/381* (2013.01); *H02J 3/06* (2013.01); *H02J 3/16* (2013.01); *H02J 2300/24* (2020.01); *H02J 2300/28* (2020.01)

(58) Field of Classification Search
CPC ...... H02J 3/381; H02J 3/06; H02J 3/16; H02J 2300/24; H02J 2300/28; H02J 3/00; H02J 3/38; Y02E 10/56; G05B 13/02
See application file for complete search history.

(56) References Cited

U.S. PATENT DOCUMENTS 4,445,049 A      4/1984  Steigerwald .................... 307/45
9,368,968 B2 *   6/2016  Schrock .................... H02J 3/32
(Continued)

OTHER PUBLICATIONS

International Search Report dated Jul. 1, 2019 in corresponding PCT International Application No. PCT/US2019/026560.
(Continued)

*Primary Examiner* — Ziaul Karim
(74) *Attorney, Agent, or Firm* — Ostrolenk Faber LLP

(57) ABSTRACT

A method for controlling power flow between a renewable energy plant and an electric power grid, the plant having an intermittent energy source, the method comprising: using a control system, measuring power output from the plant and determining a first difference between the measured power output from the plant and a power reference; measuring frequency deviation of the power output from the plant and determining a second difference between the measured frequency deviation and a frequency deviation reference; generating a first error by limiting a sum of the first and second differences between predetermined minimum and maximum power error limits; modelling power output from the source and determining a second error between the modelled power output from the source and a control signal applied to the source to control the power output therefrom; and, generating the control signal by applying the first and second errors to a PI loop.

20 Claims, 8 Drawing Sheets

(56) References Cited

U.S. PATENT DOCUMENTS

| | | | | |
|---|---|---|---|---|
| 2001/0056330 | A1* | 12/2001 | Wills | H02J 3/381 |
| | | | | 702/60 |
| 2011/0248500 | A1* | 10/2011 | Larsen | F03D 7/043 |
| | | | | 290/44 |
| 2013/0131879 | A1* | 5/2013 | Andresen | H02J 3/386 |
| | | | | 700/287 |
| 2016/0211664 | A1* | 7/2016 | Subbotin | H02J 3/00 |

OTHER PUBLICATIONS

Written Opinion dated Jul. 1, 2019 in corresponding PCT International Application No. PCT/US2019/026560.
WECC Solar Plant Dynamic Modeling Guidelines, adopted/approved by TSS on May 8, 2014, URL address: https://www.wecc.biz/Reliability/WECC%20Solar%20Plant%20Dynamic%20Modeling%20Guidelines.pdf; download date: Apr. 11, 2018.

* cited by examiner

800

```
   ┌─────────┐
   │  Start  │── 801
   └────┬────┘
        ▼
```

| With Respect to Controlling Power Flow between a Renewable Energy Plant and an Electric Power Grid, the Renewable Energy Plant having an Intermittent Energy Source, First, Using a Renewable Energy Plant Control System, Measuring Power Output from the Renewable Energy Plant and Determining a First Difference Signal between the Measured Power Output from the Renewable Energy Plant and a Power Reference | — 802 |

| Measuring Frequency Deviation of the Power Output from the Renewable Energy Plant and Determining a Second Difference Signal between the Measured Frequency Deviation and a Frequency Deviation Reference | — 803 |

| Generating a First Error Signal by Limiting a Sum of the First and Second Difference Signals between Predetermined Minimum and Maximum Power Error Limits | — 804 |

| Modelling Power Output from the Intermittent Energy Source and Determining a Second Error Signal between the Modelled Power Output from the Intermittent Energy Source and a Control Signal Applied to the Intermittent Energy Source to Control the Power Output Therefrom | — 805 |

| Generating the Control Signal by Applying the First and Second Error Signals to a Proportional-Integral Loop | — 806 |

┌─────────┐
   │   End   │── 807
   └─────────┘

METHOD AND SYSTEM FOR CONTROLLING A RENEWABLE ENERGY PLANT

CROSS-REFERENCE TO RELATED APPLICATIONS

The present application is a 35 U.S.C. §§ 371 national phase conversion of PCT/US2019/026560, filed Apr. 9, 2019, which claims priority to U.S. Provisional Patent Application No. 62/657,745, filed Apr. 14, 2018, the contents of all of which are incorporated herein by reference.

FIELD OF THE INVENTION

This invention relates to the field of control systems, and more specifically, to a method and system for controlling a renewable energy plant.

BACKGROUND OF THE INVENTION

Renewable energy plants typically include photovoltaic ("PV") and wind intermittent energy sources. FIG. 1 is a block diagram illustrating a control system for a renewable energy plant in accordance with the prior art. (See "WECC Solar Plant Dynamic Modeling Guidelines"; https://www.wecc.biz/Reliability/WECC%20Solar%20Plant%20Dynamic%20Modeling%20Guidelines.pdf; accessed Apr. 11, 2018; and incorporated herein by reference). Such control systems typically include the following. First, closed loop voltage regulation at a user-designated bus. The voltage feedback signal has provisions for line drop compensation, voltage droop response, and a user-settable dead band on the voltage error signal. Second, closed loop reactive power regulation on a user-designated branch with a user-settable dead band on the reactive power error signal. Third, a plant-level governor response signal derived from frequency deviation at a user designated bus. The frequency droop response is applied to active power flow on a user-designated branch. Frequency droop control is capable of being activated in both over and under frequency conditions. The frequency deviation applied to the droop gain is typically subject to a user-settable dead band.

One problem with such existing control systems is that rapidly increasing solar irradiance can cause an overgeneration and overcurrent protection trip.

FIG. 2 is a chart illustrating operations of the control system of FIG. 1 in accordance with the prior art. FIG. 2 illustrates performance of the above-mentioned control system during cloud passage. The x-axis is relative test time and the y-axis is power per unit (p.u.). Line 3020 represents a power reference, which limits plant generation. Line 3010 represents the maximum power that can be generated by the plant for a given irradiance. Line 3030 represents measured power generation. At approximately 44:20 (see point 3100 on line 3030), a cloud partially covers the PV plant causing a decrease in power generation. The governor's PI loop of the power control model winds up compensating for this event by increasing the loop's output. In 18 seconds, at approximately 44:38, the cloud passes (see point 3200 on line 3030) and power generation overshoots (see point 3300 on line 3030) the reference 3020.

Another problem with such existing control systems is that their controllers typically limit active power but not current.

A need therefore exists for an improved method and system for controlling a renewable energy plant. Accordingly, a solution that addresses, at least in part, the above and other shortcomings is desired.

SUMMARY OF THE INVENTION

According to one aspect of the invention, there is provided a method for controlling power flow between a renewable energy plant and an electric power grid, the renewable energy plant having an intermittent energy source, the method comprising: using a renewable energy plant control system, measuring power output from the renewable energy plant and determining a first difference signal between the measured power output from the renewable energy plant and a power reference; measuring frequency deviation of the power output from the renewable energy plant and determining a second difference signal between the measured frequency deviation and a frequency deviation reference; generating a first error signal by limiting a sum of the first and second difference signals between predetermined minimum and maximum power error limits; modelling power output from the intermittent energy source and determining a second error signal between the modelled power output from the intermittent energy source and a control signal applied to the intermittent energy source to control the power output therefrom; and, generating the control signal by applying the first and second error signals to a proportional-integral loop.

In accordance with further aspects of the invention, there is provided an apparatus such as a control system, a computer system, etc., a method for adapting these, as well as articles of manufacture such as a computer readable medium or product and computer program product or software product (e.g., comprising a non-transitory medium) having program instructions recorded thereon for practicing the method of the invention.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE EXAMPLE EMBODIMENTS

In the following description, the details are set forth to provide an understanding of the invention. In some instances, certain software, circuits, structures and methods have not been described or shown in detail in order not to obscure the invention. The term "information system" or "system" is used herein to refer to any machine for processing data, including the control systems, controllers, energy management systems, supervisory control and data acquisition ("SCADA") systems, computer systems, and network arrangements described herein. The present invention may be implemented in any computer programming language provided that the operating system of the data processing system provides the facilities that may support the requirements of the present application. Any limitations presented would be a result of a particular type of operating system or computer programming language and would not be a limitation of the present invention. The present invention may also be implemented in hardware or in a combination of hardware and software.

According to one embodiment of the invention, there is provided an improved method and system for controlling a renewable energy plant including characterization of the plant. According to another embodiment, there is provided a method for controlling energy sources for a renewable energy plant, wherein the plant is connected to a power grid, the plant has an intermittent energy source whose output is dependent on environmental variables, and a plant performance model is used.

Figure 3:
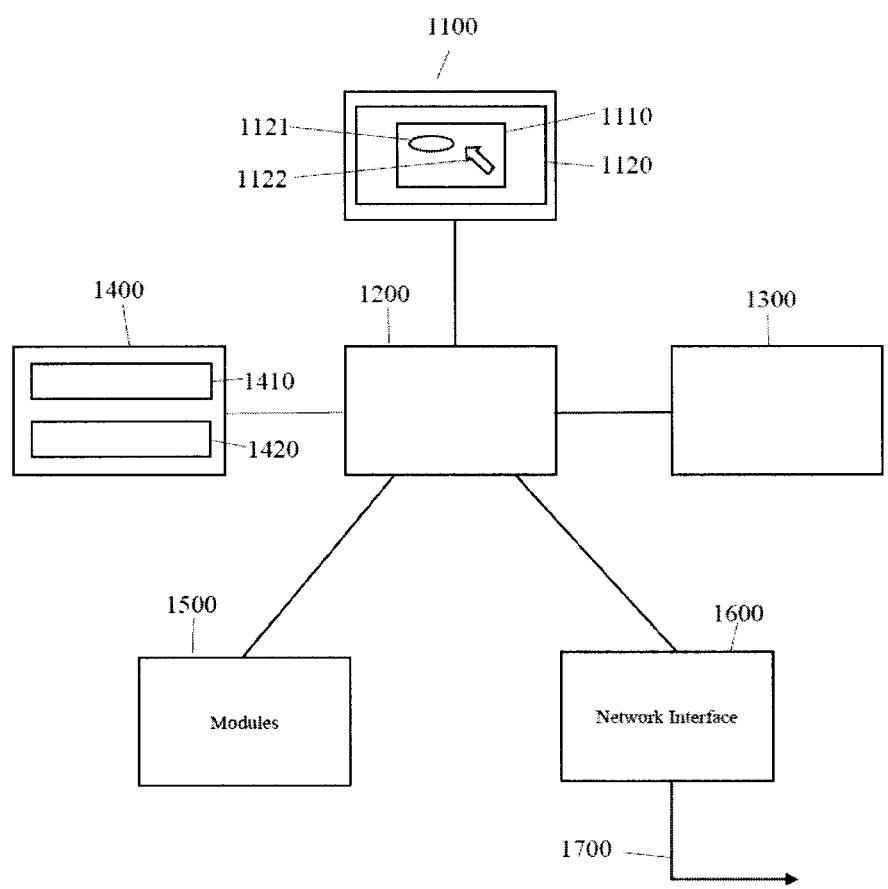
FIG. 3 is a block diagram illustrating an information system in accordance with an embodiment of the invention.

FIG. 3 is a block diagram illustrating an information system 1000 in accordance with an embodiment of the invention. The information system 1000 is suitable for performing as a control system (e.g., 2800, 2810, 2820), supervisory control and data acquisition ("SCADA") system, energy management system ("EMS"), or the like. The information system 1000 may be implemented as a virtual machine. The information system 1000 may be a client and/or a server in a client-server configuration. As an example, the information system 1000 may be a server and/or a personal computer. The information system 1000 may be a distributed system deployed on multiple processors or hosts.

The information system 1000 includes a display 1100, a processor or CPU 1200, an input device 1300, memory 1400, and an interface device 1600. The display 1100 may include a computer screen or a television screen. The CPU 1200 is coupled to a memory 1400 that stores an operating system 1420 to manage the information system 1000. The CPU 1200 is operatively coupled to an input device 1300 for receiving user commands and to the display 1100 for displaying the results of these commands to a user. These commands may also be received over a network 1700 via the interface device 1600. The CPU 1200 may operate in association with dedicated co-processors, memory devices, or other hardware modules 1500. The input device 1300 may include a keyboard, mouse, touchpad, or the like. The memory 1400 may include a plurality of storage devices including an internal memory and an external storage device. For example, memory 1400 may include databases, random access memory, read-only memory, flash drives, and/or hard disk devices. The information system 1000 may include a database management system and a database 1410 that may be stored in the memory 1400 of the information system 1000. The interface device 1600 may include one or more network connections. The information system 1000 may be adapted to communicate with other information systems over a network 1700 (e.g., control systems 2800, 2810, 2820) via the interface device 1600. For example, the interface device 1600 may include an interface to a network 1700 such as the Internet and/or a wireless network. Thus, the interface device 1600 may include suitable transmitters, receivers, connectors, and the like. The information system 1000 may be associated with other information systems over the network 1700. Of course, the information system 1000 may include additional software and hardware, the description of which is not necessary for understanding the invention.

The information system 1000 includes programmed computer-executable instructions to implement embodiments of the present invention. The instructions may be embodied in one or more hardware modules 1500 or program (software) modules (e.g., 1420) resident in the memory 1400 of the information system 1000. Alternatively, programmed instructions may be embodied on a machine-readable medium or product such as one or more DVDs, CDs, etc.

A user may interact with the information system 1000 using a user interface ("UI") 1120 such as a graphical user interface. The UI 1120 may be used for monitoring, managing, and accessing the information system 1000. Typically, a UI is used to display information to and receive commands from users and includes a variety of controls including icons, drop-down menus, toolbars, text, buttons, and the like. A user interacts with the UI 1120 presented on a display 1100 by using an input device 1300 to position a pointer or cursor 1122 over a graphical object, for example, an icon, menu, etc. 1121 and by selecting the object 1121. Typically, UI elements are presented in at least one window 1110, that is, a rectangular area within the display 1100. A window 1110 may be open, closed, displayed full screen, reduced in size, or moved to different areas of the display 1100.

Figure 4:
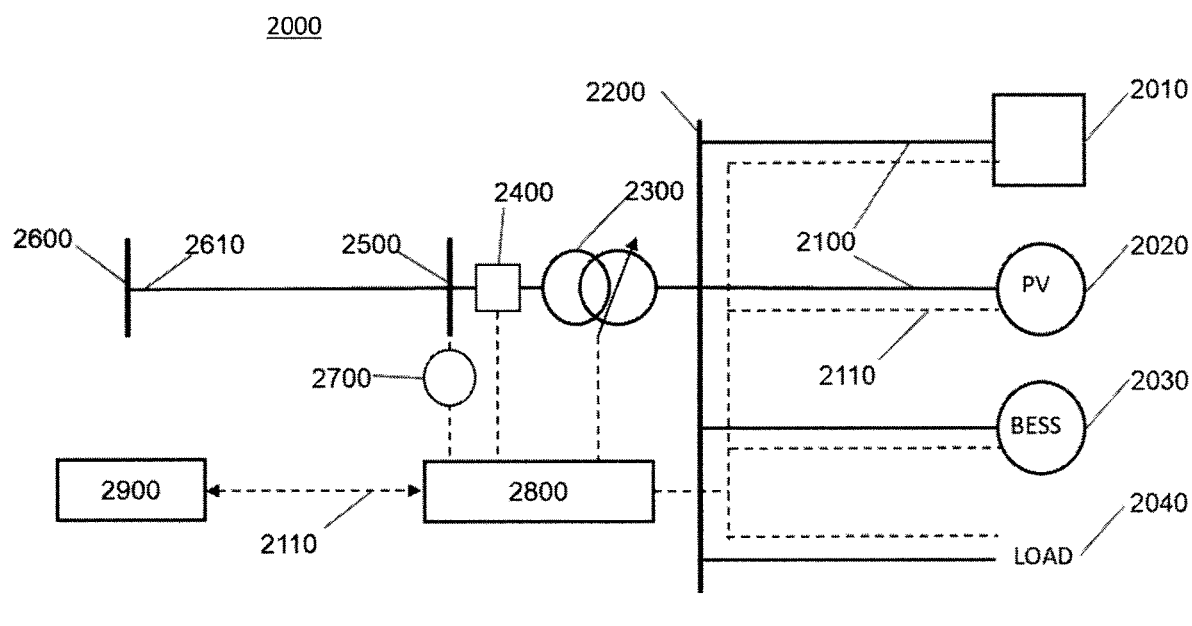
FIG. 4 is a block diagram illustrating a renewable energy plant in accordance with an embodiment of the invention.

FIG. 4 is a block diagram illustrating a renewable energy plant 2000 in accordance with an embodiment of the invention. The renewable energy plant 2000 may be a photovoltaic plant. The photovoltaic plant 2000 may include a photovoltaic system 2020 which includes photovoltaic arrays 2021, inverters 2022, and transformers. An electrical collector subsystem, which includes feeders 2100 and a medium voltage bus 2200, connects the PV system 2020 to a generator step-up transformer 2300. The generator step-up transformer 2300 may be equipped with an on-load tap changer. The control system 2800 (e.g., information system 1000) controls the properties of the PV system 2020 at a point of common coupling 2600. The control system 2800 receives setpoints from a master SCADA/EMS 2900 (e.g., information system 1000) over a communications network 2110 (e.g., network 1700). The control system 2800 receives measurements from a power meter 2700 located at a point of metering 2500. The plant 2000 may also include: a battery energy storage system ("BESS") 2030, an electric load 2040, shunt capacitors and reactor banks 2010, or combinations of these. Finally, a circuit breaker 2400 connects the plant 2000 to the electrical grid 2610.

Figure 5:
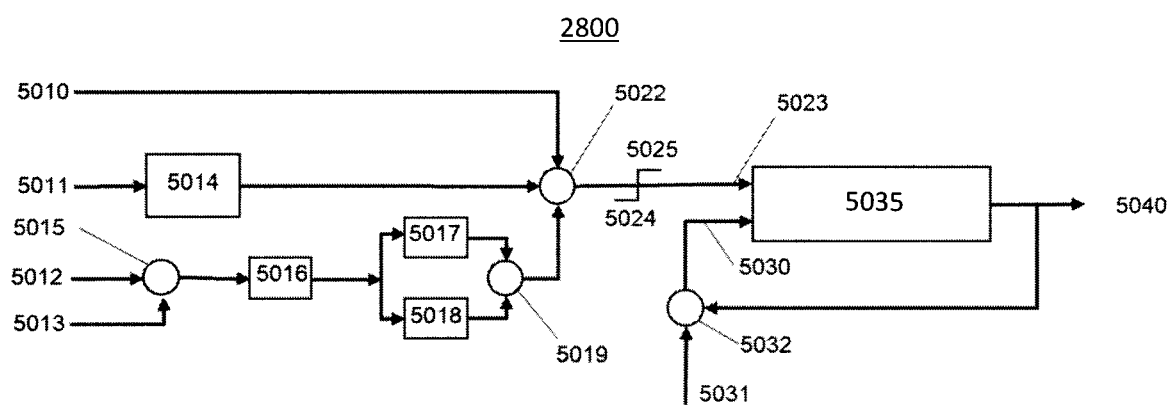
FIG. 5 is a block diagram illustrating a control system in accordance with an embodiment of the invention.

FIG. 5 is a block diagram illustrating a control system 2800 in accordance with an embodiment of the invention. Measured at the point of metering (e.g., 2500 in FIG. 4), power flow for plant regulation 5011 is processed through a filter 5014 and subtracted from a power reference 5010 in a summation block 5022. The frequency droop response applied to active power flow 5011 acts during frequency events. Frequency deviation 5012 is subtracted in block 5015 from a frequency deviation reference 5013. The droop is defined by an over- and under-frequency dead band block

5016. Down and up regulation droop is defined by blocks 5017 and 5018 and summation block 5019. An error signal "E" 5023 is limited between minimum 5024 and maximum 5025 power error limits in droop regulation. The error signal 5023 is handled by a proportional-integral ("PI") loop (or controller) 5035. The loop output 5040 is distributed among the inverters 2022 to control the active power output of the inverters 2022 (i.e., of the photovoltaic system 2020).

Referring again to FIG. 5, the control system 2800 has additional feedback in the form of a sum of inverters generation 5031 signal (i.e., power generation measurements from the generating units 2020 at their inverters 2022). An inverters control error signal "Ei" 5030 is a difference 5032 between the controller's output 5040 and the inverters generation 5031. The PI loop 5035 is characterized by the regulator's proportional gain Kpg, integral gain Kig, and error gain Kii as follows:

$$E*Kpg+E*Kig/s+Ei*Kii/s \quad \text{(Equation 1)}$$

When the inverters 2022 follow the controller's output command signal 5040, the inverters' control error signal Ei 5030 is zero and it does not affect plant control.

Referring again to FIG. 5, when a cloud covers the PV arrays 2021 causing a decrease in power generation below the power reference 5010, the inverters 2022 do not follow command signal 5040 causing the error 5030 to deviate from zero. The command signal 5040 settles close to and above the generation level preventing the integrator from winding up and the controller 2800 can react quickly when irradiance increases.

Figure 6:
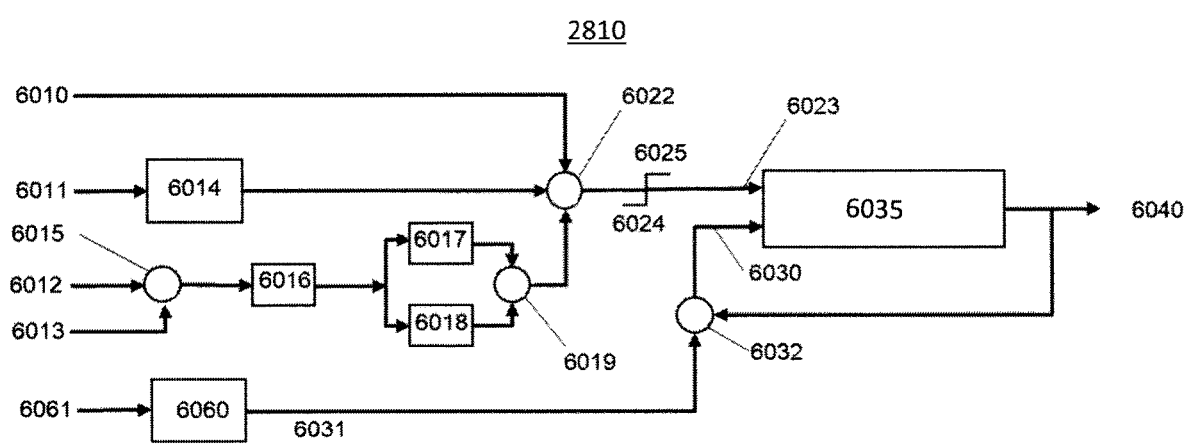
FIG. 6 is a block diagram illustrating a control system in accordance with another embodiment of the invention.

FIG. 6 is a block diagram illustrating a control system 2810 in accordance with another embodiment of the invention. Similar to the control system 2800 illustrated in FIG. 5, measured active power flow for plant regulation 6011 is processed through a filter 6014 and subtracted from a power reference 6010 in a summation block 6022. The frequency droop response applied to active power flow 6011 acts during frequency events. Frequency deviation 6012 is subtracted in block 6015 from a frequency deviation reference 6013. The droop is defined by over- and under-frequency dead band block 6016. Down and up regulation droop is defined by blocks 6017 and 6018 and summation block 6019. An error signal 6023 is limited between minimum 6024 and maximum 6025 power error limits in droop regulation. The error signal 6023 is handled by a proportional-integral ("PI") loop (or controller) 6035 similar to the PI loop 5035 in FIG. 5. The loop output 5040 is distributed among the inverters 2022 to control active power output.

Referring again to FIG. 6 the feedback signal 6031 is calculated based on measured electrical properties 6061 at the point of metering 2500 (see FIG. 4) and a plant model 6060. This embodiment does not require fast data acquisition of inverter generation (i.e., power generation measurements from the generating units 2020 at their inverters 2022) which can be problematic for large plants. Measured electrical properties 6061 may include currents and voltages, their phase angles and magnitudes, active and reactive power, or any combination thereof. The plant model 6060 may include a line drop compensation model, power flow model, or any other model allowing for the derivation of inverter generation from the measured electrical properties 6061. For plants equipped with battery storage 2030 and loads 2040, the measured electrical properties 6061 may include power flow to and from the battery storage 2030 and loads 2040.

Referring again to FIG. 6, one example of the model 6060 may be as follows:

$$Pi=P+I*I*R \quad \text{(Equation 2)}$$

where Pi is the modeled sum of inverters generation 6031, P is the measured active power at the point of metering 2500, I is the measured current at the point of metering 2500, and R is the resistive component of line impedance. Both P and I in this example are measured electrical properties 6061. Model parameter R is an equivalent impedance of the collector system 2100 and the transformer 2300.

Figure 7:
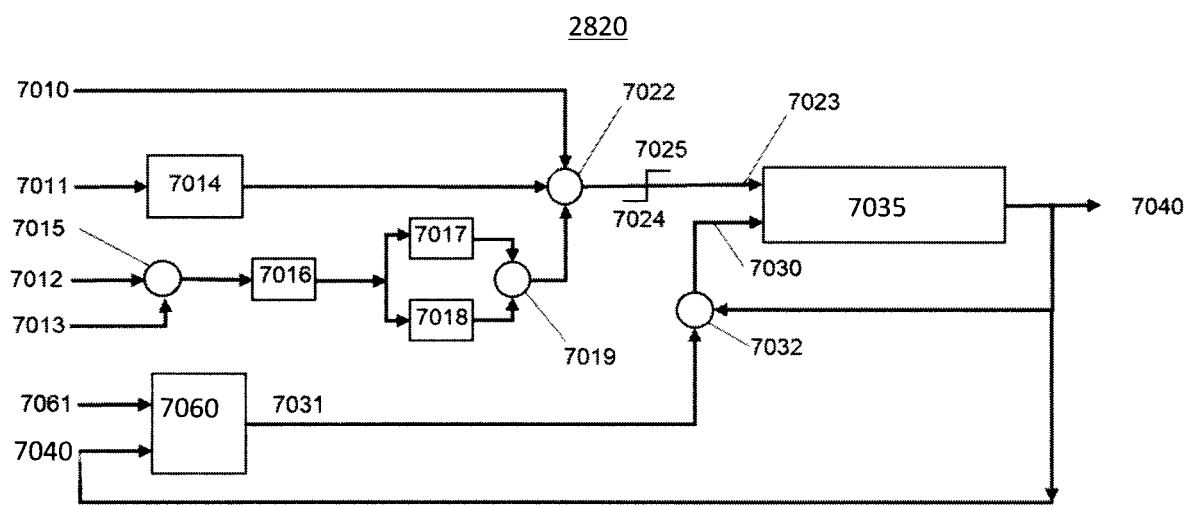
FIG. 7 is a block diagram illustrating a control system in accordance with yet another embodiment of the invention; and, FIG. 8 is a flow chart illustrating operations of modules within an information system for controlling power flow between a renewable energy plant and an electric power grid, the renewable energy plant having an intermittent energy source, in accordance with an embodiment of the invention.

FIG. 7 is a block diagram illustrating a control system 2820 in accordance with yet another embodiment of the invention. Similar to the control system 2800 illustrated in FIG. 5, measured active power flow for plant regulation 7011 is processed through a filter 7014 and subtracted from a power reference 7010 in a summation block 7022. The frequency droop response applied to active power flow 7011 acts during frequency events. Frequency deviation 7012 is subtracted in block 7015 from a frequency deviation reference 7013. The droop is defined by over- and under-frequency dead band block 7016. Down and up regulation droop is defined by blocks 7017 and 7018 and summation block 7019. An error signal 7023 is limited between minimum 7024 and maximum 7025 power error in droop regulation. The error signal 7023 is handled by a proportional-integral ("PI") loop 7035 (or controller) similar to the PI loop 5035 in FIG. 5. The loop output 7040 is distributed among the inverters 2022 to control active power output.

Figure 1:
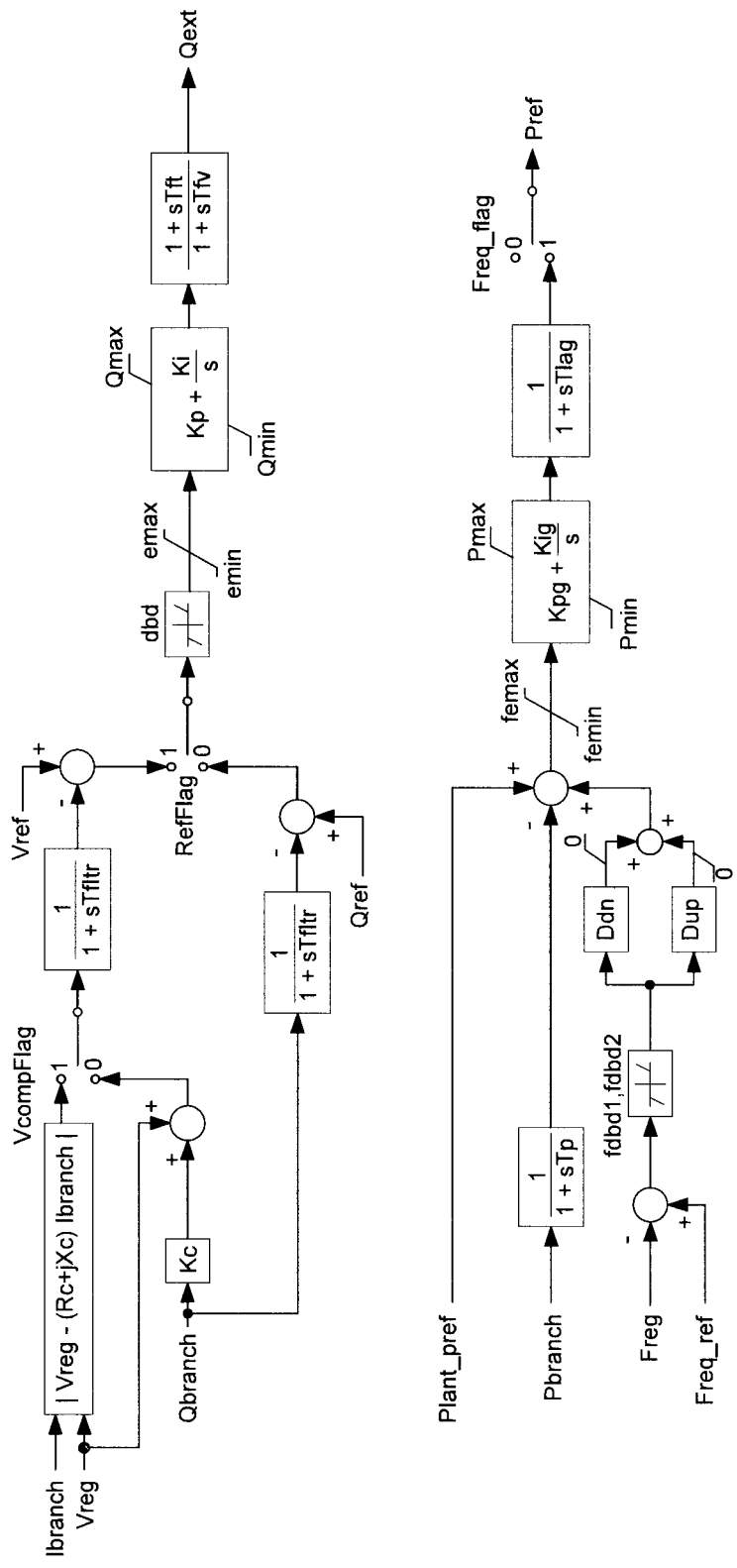
FIG. 1 is a block diagram illustrating a control system for a renewable energy plant in accordance with the prior art.
Figure 2:
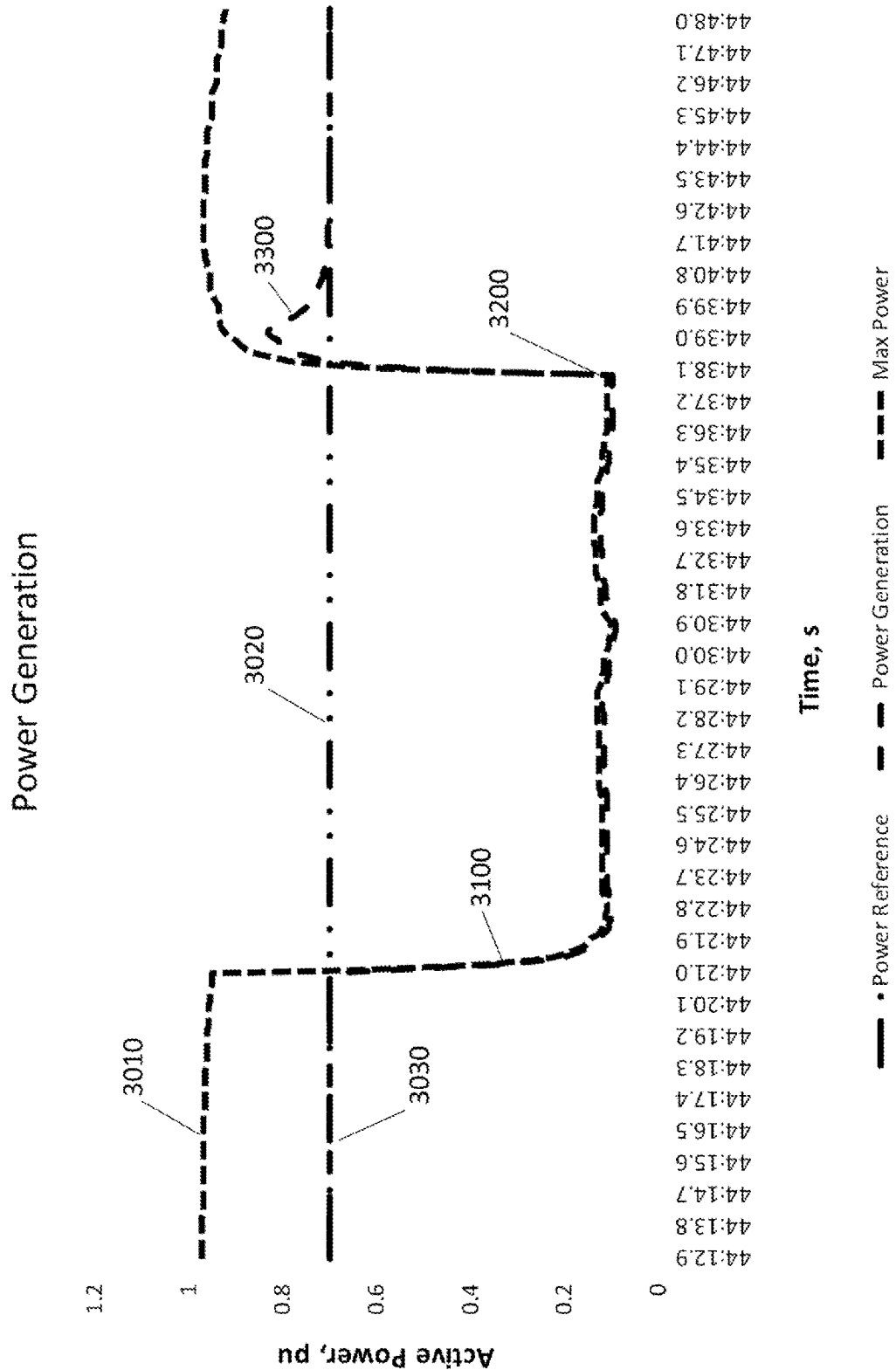
FIG. 2 is a chart illustrating operations of the control system of FIG. 1 in accordance with the prior art.

Referring again to FIG. 7, the feedback signal 7031 is calculated based on measured electrical properties 7061 at the point of metering 2500 (see FIG. 2) and an adaptive plant model 7060. The adaptive plant model 7060 of this embodiment allows for automated calibration by comparing modeled inverters generation 7031 with measured inverters generation 7061. The calibration procedure is intended to compensate for the difference between the modeled and measured generation values 7031, 7061 by adapting the configuration parameters of the adaptive plant model 7060. Referring to Equation 2 above, the calibration procedure can adjust the resistive component of line impedance R to minimize modeling error. The calibration procedure can be executed according to a predefined schedule or when the modeling error increases above a predefined error limit.

Referring to FIGS. 5-7, the power reference 5010, 6010, 7010 may be set by an operator through a user interface 1120 of the control system 2800, 2810, 2820 or may be communicated over the network 1700. The power reference 5010, 6010, 7010 may be calculated based on a current limit and measured electrical properties at the point of metering 2500. As an example, the following formula may be used for this calculation:

$$P=3*V*I*\cos Phi \quad \text{(Equation 3)}$$

where V is the measured phase voltage, I is the measured phase current, and cos Phi is the cosine of the phase angle between vectors V and I. According to one embodiment, the power reference 5010, 6010, 7010 may be calculated as a minimum of a power reference set by the operator and a power reference calculated based on a current limit.

According to one embodiment, the feedback signal 7040 used for active power control in the above control system 2820 may also be used to control voltage, reactive power, or power factor. According to this embodiment, a method is provided for controlling a renewable energy plant 2000, the plant 2000 having an intermittent energy source 2020, the method comprising: using a renewable energy plant control system 2820, maintaining voltage, or reactive power, or power factor at the point of interconnection 2600 with a power grid 2610 coupled to the renewable energy plant 2000 by: measuring voltage, reactive power, or power factor for plant regulation and subtracting its value from their respective references; handling an error signal by a proportional-integral loop 7035; distributing the loop output 7040 among the inverters 2022 to control their reactive power; adding to the loop 7035 an error between the loop output 7040 and measured intermittent energy source voltage, reactive power, or power factor 7061 through an error gain 7032. The method may further include modeling intermittent energy source voltage, reactive power, or power factor using measured electrical properties 7061 and an intermittent power plant model 7060.

Referring again to FIGS. 4 and 7, according to one embodiment, there is provided a method for controlling a renewable energy plant 2000, the plant having an intermittent energy source 2020, the method comprising: using a renewable energy plant control system 2800, 2810, 2820, maintaining power flow to and from a power grid coupled 2610 to the renewable energy plant 2000 by: measuring active power flow for plant regulation 7011 and subtracting 7022 its value from a power reference 7010; applying a frequency droop response to the active power flow during frequency events; handling an error signal by a proportional-integral loop 7035; distributing the loop output 7040 among the inverters 2022 to control their active power; and, adding to the loop 7035 an error 7030 between the loop output 7040 and modelled intermittent energy source generation 7031 through an error gain 7032. In the above method, the intermittent energy source may include a photovoltaic energy source 2020. The intermittent energy source may include a wind turbine. The intermittent energy source may be one or more intermittent energy sources. The renewable energy plant 2000 may have an energy load 2040 coupled thereto. The energy load may be one or more energy loads. The method may further include modeling intermittent energy source generation from measured electrical properties 7061 and an intermittent power plant model 7060. The measured electrical properties 7061 may include currents, voltages, power, or their combination suitable for production of an intermittent energy source generation value. The power plant model 7060 may be a power flow model. The power plant model 7060 may be a line drop compensation model. The renewable energy plant 2000 may have coupled thereto a controllable load. The controllable load may be one or more controllable loads. The renewable energy plant 2000 may have coupled thereto an energy storage 2030. The energy storage may be one or more energy storages. The method may further include adapting the power plant model 7060 by: comparing modeled intermittent energy source generation 7031 with the measured intermittent energy source generation 7061; and, adjusting the model's configuration parameters 7060 to minimize the error between the measured intermittent energy source generation 7061 and modeled intermittent energy source generation 7031. And, the method may further include calculating the power reference 7010 as a minimum between a power reference value and a power reference corresponding to a current limit for existing operating parameters.

According to another embodiment, there is provided a method for controlling a renewable energy plant 2000, the renewable energy plant 2000 having an intermittent energy source 2020 coupled thereto, the method comprising: using a renewable energy plant control system 2820, managing the intermittent energy source 2020 to maintain active power and limit current to and from a power grid 2610 coupled to the renewable energy plant 2000 by: acquiring electrical property measurements at a point of metering 2500; modeling power generation by the intermittent energy source 2020; and, transmitting a control signal 7040 to the intermittent energy source 2020 to limit active power flow and current at a point of common coupling 2600.

The embodiments described herein may contribute to an improved method and system for controlling a renewable energy plant 2000 and may provide one or more advantages. For example, the method and system reduce or prevent renewable plant power overgeneration and/or current overshoot by using a feedback signal based on generation measurements from the generating units/inverters, or power plant measurements at the point of metering 2500 and applying those to a power plant model 7060.

Aspects of the methods and systems described herein may be illustrated with the aid of a flowchart.

FIG. 8 is a flow chart illustrating operations 800 of modules (e.g., 1420, 1500) within an information system (e.g., 1000, 2820) for controlling power flow between a renewable energy plant 2000 and an electric power grid 2610, the renewable energy plant 2000 having an intermittent energy source 2020, in accordance with an embodiment of the invention.

At step 801, the operations 800 start.

At step 802, using a renewable energy plant control system (e.g., 2820), power output from the renewable energy plant 2000 is measured and a first difference signal between the measured power output 7011 from the renewable energy plant 2000 and a power reference 7010 is determined.

At step 803, frequency deviation (or frequency) of the power output from the renewable energy plant 2000 is measured and a second difference signal between the measured frequency deviation (or measured frequency) 7013 and a frequency deviation reference (or frequency reference) 7012 is determined.

At step 804, a first error signal 7023 is generated by limiting a sum 7022 of the first and second difference signals between predetermined minimum and maximum power error limits 7024, 7025.

At step 805, power output from the intermittent energy source 2020 is modelled and a second error signal 7030 between the modelled power output 7031 from the intermittent energy source 2020 and a control signal 7040 applied to the intermittent energy source 7020 to control the power output therefrom is determined.

At step 806, the control signal 7040 is generated by applying the first and second error signals 7023, 7030 to a proportional-integral loop 7035.

At step 807, the operations 800 end.

In the above method, the modelling power output from the intermittent energy source 2020 may include measuring power output from the intermittent energy source 2020 to generate the modelled power output 5031 from the intermittent energy source 2020.

Also in the above method, the modelling power output from the intermittent energy source 2020 may include measuring electrical properties of the renewable energy plant 2000 and applying the measured electrical properties 6061 to a model 6060 of the intermittent energy source 2020 to generate the modelled power output 6031 from the intermittent energy source 2020. The electrical properties may be measured at a point of metering 2500 of the renewable energy plant 2000. The electrical properties may include one or more of current, voltage, and power. The model 6060 may be at least one of a power flow model and a line drop compensation model.

Also in the above method, the modelling power output from the intermittent energy source 2020 may include measuring electrical properties of the renewable energy plant 2000 and applying the measured electrical properties 7061 and the control signal 7040 to an adaptive model 7060 of the intermittent energy source 2020 to generate the modelled power output 7031 from the intermittent energy source 2020. The electrical properties may be measured at a point of metering 2500 of the renewable energy plant 2000. The electrical properties may include one or more of current, voltage, and power. The adaptive model 7060 may adjust a resistive component of line impedance. The method may further include adjusting the adaptive model 7060 to minimize a difference between modeled intermittent energy source power output and measure intermittent energy source power output.

Also in the above method, the power reference 7010 may be a minimum of the power reference 7010 and a power reference corresponding to a current limit for existing operating parameters. The power output from the renewable energy plant 2000 may be active power output, the power reference 7010 may be an active power reference, the minimum and maximum power error limits 7024, 7025 may be minimum and maximum active power error limits, and the power output from the intermittent energy source 2020 may be an active power output. The intermittent energy source may include a photovoltaic energy source 2020. The intermittent energy source may include a wind turbine. The intermittent energy source may be one or more intermittent energy sources. The renewable energy plant 2000 may have at least one energy load 2040 coupled thereto. The renewable energy plant 2000 have at least one controllable load coupled thereto. And, the renewable energy plant 2000 may have at least one energy storage 2030 coupled thereto.

According to one embodiment, each of the above steps 801-807 may be implemented by a respective software module 1420. According to another embodiment, each of the above steps 801-807 may be implemented by a respective hardware module 1500 (e.g., application-specific hardware 1500). According to another embodiment, each of the above steps 801-807 may be implemented by a combination of software 1420 and hardware modules 1500. For example, FIG. 8 may represent a block diagram illustrating the interconnection of specific hardware modules 801-807 (collectively 1500) within the information system or systems 1000, each hardware module 801-807 adapted or configured to implement a respective step of the method of the application.

According to one embodiment, one or more of the software 1420 and hardware modules 1500 (or to components referred to as a "module" herein) may be implemented by one or more information systems 1000 or components thereof.

According to one embodiment, certain implementations of the functionality of the present application are sufficiently mathematically, computationally, or technically complex that application-specific hardware (e.g., 1500) or one or more physical computing devices (e.g., 1000, 1200, 2820) (using appropriate executable instructions (e.g., 1420)) may be necessary or essential to perform that functionality, for example, due to the volume or complexity of the calculations involved and/or to provide results substantially in real-time.

While this application is primarily discussed as a method, a person of ordinary skill in the art will understand that the apparatus discussed above with reference to an information system 1000 may be programmed to enable the practice of the method of the invention. Moreover, an article of manufacture for use with an information system 1000, such as a pre-recorded storage device or other similar computer readable medium or computer program product including program instructions recorded thereon, may direct the information system 1000 to facilitate the practice of the method of the invention. It is understood that such apparatus, products, and articles of manufacture also come within the scope of the invention.

In particular, the sequences of instructions which when executed cause the method described herein to be performed by the information system 1000 may be contained in a data carrier product according to one embodiment of the invention. This data carrier product may be loaded into and run by the information system 1000. In addition, the sequences of instructions which when executed cause the method described herein to be performed by the information system 1000 may be contained in a computer software product or computer program product (e.g., comprising a non-transitory medium) according to one embodiment of the invention. This computer software product or computer program product may be loaded into and run by the information system 1000. Moreover, the sequences of instructions which when executed cause the method described herein to be performed by the information system 1000 may be contained in an integrated circuit product (e.g., a hardware module or modules 1420, 1500) which may include a coprocessor or memory according to one embodiment of the invention. This integrated circuit product may be installed in the information system 1000.

The embodiments of the application described above are intended to be examples only. Those skilled in the art will understand that various modifications of detail may be made to these embodiments, all of which come within the scope of the invention.

What is claimed is:

1. A method for controlling power flow between a renewable energy plant and an electric power grid, the renewable energy plant having an intermittent energy source, the method comprising:
   using a renewable energy plant control system, measuring power output from the renewable energy plant and determining a first difference signal between the measured power output from the renewable energy plant and a power reference;
   measuring frequency deviation of the power output from the renewable energy plant and determining a second difference signal between the measured frequency deviation and a frequency deviation reference;
   generating a first error signal by limiting a sum of the first and second difference signals between predetermined minimum and maximum power error limits;
   modelling power output from the intermittent energy source and determining a second error signal between the modelled power output from the intermittent energy source and a control signal applied to the intermittent energy source to control the power output therefrom; and,
   generating the control signal by applying the first and second error signals to a proportional-integral loop.

2. The method of claim 1, wherein the modelling power output from the intermittent energy source includes measuring power output from the intermittent energy source to generate the modelled power output from the intermittent energy source.

3. The method of claim 1, wherein the modelling power output from the intermittent energy source includes measuring electrical properties of the renewable energy plant and applying the measured electrical properties to a model of the intermittent energy source to generate the modelled power output from the intermittent energy source.

4. The method of claim 3, wherein the electrical properties are measured at a point of metering of the renewable energy plant.

5. The method of claim 4, wherein the electrical properties include one or more of current, voltage, and power.

6. The method of claim 3, wherein the model is at least one of a power flow model and a line drop compensation model.

7. The method of claim 1, wherein the modelling power output from the intermittent energy source includes measuring electrical properties of the renewable energy plant and applying the measured electrical properties and the control signal to an adaptive model of the intermittent energy source to generate the modelled power output from the intermittent energy source.

8. The method of claim 7, wherein the electrical properties are measured at a point of metering of the renewable energy plant.

9. The method of claim 8, wherein the electrical properties include one or more of current, voltage, and power.

10. The method of claim 9, wherein the adaptive model adjusts a resistive component of line impedance.

11. The method of claim 10, further comprising adjusting the adaptive model to minimize a difference between modeled intermittent energy source power output and measure intermittent energy source power output.

12. The method of claim 1, wherein the power reference is a minimum of the power reference and a power reference corresponding to a current limit for existing operating parameters.

13. The method of claim 1, wherein the power output from the renewable energy plant is an active power output, wherein the power reference is an active power reference, wherein the minimum and maximum power error limits are minimum and maximum active power error limits, and wherein the power output from the intermittent energy source is an active power output.

14. The method of claim 1, wherein the intermittent energy source includes a photovoltaic energy source.

15. The method of claim 1, wherein the intermittent energy source includes a wind turbine.

16. The method of claim 1, wherein the intermittent energy source is one or more intermittent energy sources.

17. The method of claim 1, wherein the renewable energy plant has at least one energy load coupled thereto.

18. The method of claim 1, wherein the renewable energy plant has at least one controllable load coupled thereto.

19. The method of claim 1, wherein the renewable energy plant has at least one energy storage coupled thereto.

20. A control system for controlling power flow between a renewable energy plant and an electric power grid, the renewable energy plant having an intermittent energy source, the control system comprising:

a processor coupled to memory; and, at least one of hardware and software modules within the memory and controlled or executed by the processor, the modules including computer readable instructions executable by the processor for causing the control system to implement the method of claim 1.

* * * * *